Feb. 7, 1928.
M. D. CAMHY
1,658,704
PROTECTION OF ELECTRIC SYSTEMS
Filed March 11, 1926
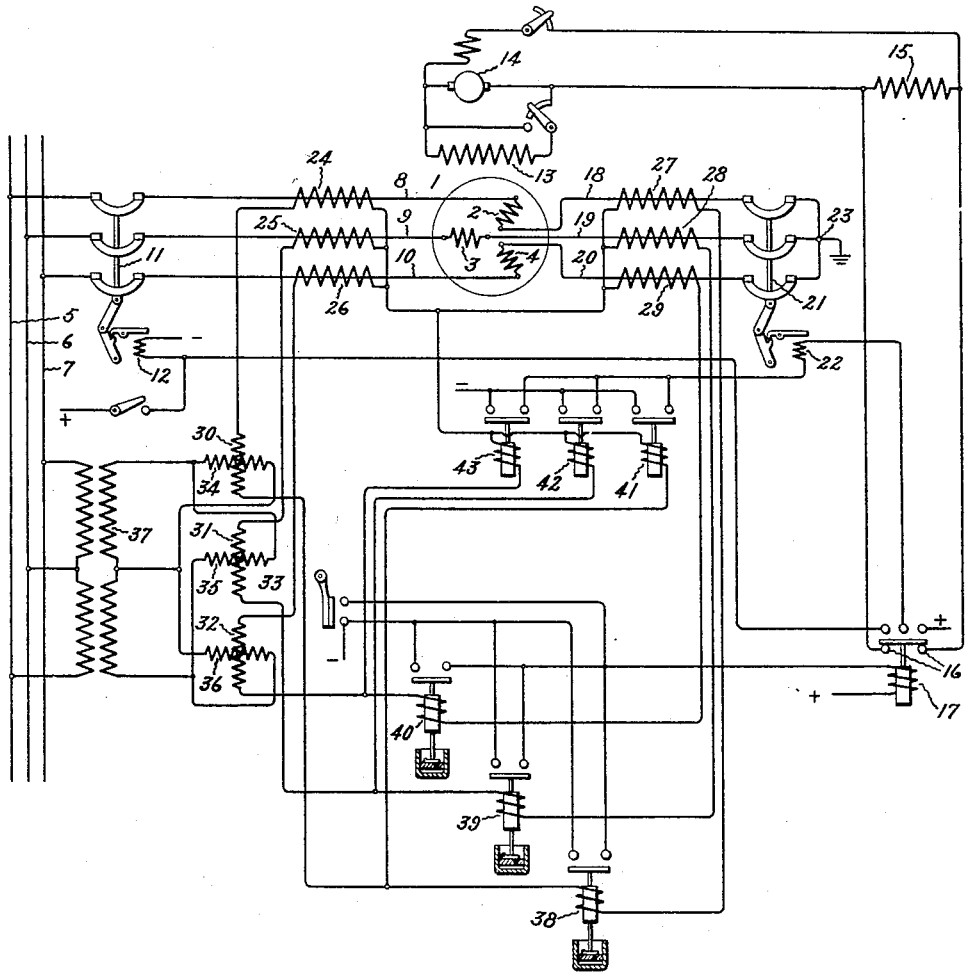
Inventor:
Musaffer Daut Camhy,
by
His Attorney.

Patented Feb. 7, 1928.

1,658,704

UNITED STATES PATENT OFFICE.

MUSAFFER DAUT CAMHY, OF BERLIN, GERMANY, ASSIGNOR TO GENERAL ELECTRIC COMPANY, A CORPORATION OF NEW YORK.

PROTECTION OF ELECTRIC SYSTEMS.

Application filed March 11, 1926, Serial No. 94,027, and in Germany April 25, 1925.

My invention relates to improvements in the protection of electric systems, and more particularly to improvements in the protection of apparatus for generating polyphase alternating currents and has for an object to provide an improved protective arrangement for protecting polyphase generators on the occurrence of internal faults.

For protective purposes, electric systems are often provided with differential protective devices or over-current protective devices or both. The differential protective devices are arranged to operate when an abnormal condition such as a short-circuit occurs within the zone or portion of the system which is protected. Generally, the differential protective devices operate quickly enough to open circuit the part of the system to be protected before damage is done. With electric current generators, a fault such as a short-circuit may occur on the generator side of the circuit interrupter which connects the generator to the system either in the generator itself or the connecting leads therefrom. The operation of the differential protective devices to open the circuit interrupter is, however, partially ineffective since the current supply is not interrupted at the short-circuit point. The field weakening which occurs simultaneously certainly tends to diminish the danger and the short-circuit current is reduced as a result of decreasing the potential. The current, however, remains so high that on further running of the generator the windings thereof may sustain considerable damage. Thus, with the usual connection, the generator protective devices, although they isolate the faulty generator from the system and thereby prevent other generators working in parallel from feeding into the fault, are not entirely efficacious. If the faulty generator itself is to be protected against the effect of its own fault, then a generation of current in it must be made impossible.

In accordance with my invention, this generation of current is prevented on the operation of the protective device in that not only the switch between the generator and the circuit is released but also another switch which interconnects the phases of the windings is substantially simultaneously released so that the windings are in contact only at the fault point. When faults occur on the system beyond the switch or circuit interrupter which connects the generator to the system, it is undesirable to have both switches released and the relay arrangements for controlling the two switches are arranged accordingly.

My invention will be better understood from the following description taken in connection with the accompanying drawing and its scope will be pointed out in the appended claims.

In the single figure of the accompanying drawing which diagrammatically illustrates a protective arrangement embodying my invention, a polyphase generator 1, herein shown as a three-phase machine, has one end of each of its phase or armature windings 2, 3 and 4 connected to a three-phase circuit or bus 5, 6 and 7 through leads 8, 9 and 10 and suitable circuit interrupting means such as a circuit breaker 11 having a trip coil 12. The field winding 13 of the generator 1 is arranged to be energized by an exciter 14 and is connected in circuit with a discharge resistance 15 which is arranged normally to be short circuited, for example through the contacts 16 of an auxiliary relay 17.

In order that the windings 2, 3 and 4 can be disconnected not only from the bus 5, 6, 7 but also from each other, the other end of each of these windings is brought out through leads 18, 19 and 20 respectively, which are arranged to be interconnected by a switch or circuit interrupter 21 having a trip coil 22. In the illustrated embodiment of my invention, the arrangement is such as to provide a star connection, the neutral point 23 of which may or may not be grounded.

For controlling the switches 11 and 21 in accordance with the location of a fault, that is whether the fault is on the system beyond the generator or on the generator itself, I provide means such that, for a fault beyond the generator, only the switch 11 is opened and for a fault on the generator both of the switches 11 and 21 are opened. This means may include a differential protective arrangement comprising as shown a plurality of current transformers 24, 25, 26 and 27, 28, 29 connected in the leads 8, 9, 10 and 18, 19 and 20 respectively and having their secondaries connected in series normally for circulating current. The secondary or circulating current circuits may have in series therewith the respective current windings 30, 31, 32 of a polyphase power directional relay 33 whose potential coils 34, 35, 36 are arranged to be energized from the bus 5, 6, 7 through an open delta connected potential transformer 37, and also the windings of over-current relays 38, 39, 40 which may be time delay devices as shown. The relays 37, 38, 39 and 40 are arranged to control the switch 11 in any suitable manner, for example, through the auxiliary relay 17, their contacts being arranged in parallel so that upon the operation of any one, the relay 17 is energized to complete the circuit of the trip coil 12 and to close contacts in the circuit of the trip coil 22. Across equipotential points of the secondary circuits are connected over-current relays 41, 42, 43 which are consequently energized in accordance with the respective differences between the currents in the corresponding leads from the ends of the respective windings, that is the difference between the currents flowing at the points where the current transformers are connected.

For a fault on the system beyond the switch 11, excess current will appear in one or more of the circulating current circuits and consequently one or more of the relays 38, 39, 40 will operate thereby effecting the energization of the auxiliary relay 17. This relay in turn completes the circuit of the trip coil 12 of the switch 11, cuts in the discharge resistance 15 and closes contacts in the circuit of the trip coil 22. Since the currents in corresponding leads or conductors at the points where the current transformers are located are the same under the fault condition assumed, none of the relays 41, 42, 43 will operate and therefore the circuit of the trip coil 22 will not be completed. Consequently only the switch 11 will be opened.

For a fault within the zone between the current transformers, such as a short-circuit between two of the windings 2, 3, 4 of the generator 1, power may be fed into the fault from the system thereby causing the power directional relay 33 to operate or some one of the over-current relays 38, 39, 40 may operate due to excess current in one or more of the circulating current circuits. Consequently, the auxiliary relay 17 is energized. This relay completes the circuit of trip coil 12, closes contacts in the circuit of trip coil 22 and cuts in the discharge resistance 15. Under the fault condition assumed, the currents in corresponding conductors at the points where the current transformers are located are no longer equal and the equipotential points in the secondary circuits cease to have the same potential. Therefore, at least one of the relays 41, 42, 43 is energized and closes its contacts thereby completing the circuit of the trip coil 22 and effecting the opening of the switch 21. Consequently, in case of a fault on the generator, its polyphase windings are not only disconnected from the system but they are also disconnected at one end each from the other and contact remains only at the fault point. Therefore, the circulation of current in the windings is prevented.

What I claim as new and desire to secure by Letters Patent of the United States, is as follows:

1. In combination with a polyphase generator, a switch for interconnecting the generator windings at one end thereof and means for effecting the opening of said switch on the occurrence of abnormal conditions on the generator windings.

2. In combination with a polyphase electric circuit and a polyphase generator, circuit interrupting means for connecting the generator windings to the circuit and for interconnecting the windings, and relay means operative on the occurrence of a fault on the generator windings to control the interrupting means.

3. In combination with a three-phase generator, a switch for connecting the generator windings in star, and differential protective means for controlling the switch on the occurrence of a fault on the generator windings.

4. In combination with a polyphase electric circuit and a polyphase generator, leads from both ends of the windings of the generator, a circuit interrupter for connecting the leads at one end of the windings to the circuit, a switch for interconnecting the leads at the other end of the windings, and means for controlling the switch connected to be energized in accordance with the difference between the currents in the leads from one of said windings.

5. In combination with a polyphase electric circuit and a polyphase generator, a circuit interrupter for connecting one end of each of the generator windings to the circuit, a switch for interconnecting the other ends of the windings, and relay means for controlling the circuit interrupter and the switch arranged to open only the circuit interrupter on the occurrence of a fault on the circuit and to open both the circuit interrupter and the switch on the occurrence of a fault on the generator windings.

6. In combination with a three-phase generator, a switch for connecting the generator windings in star, and protective means comprising a relay for effecting the opening of the switch on the occurrence of a fault on the generator windings.

In witness whereof, I have hereunto set my hand this 23rd day of February, 1926.

MUSAFFER DAUT CAMHY.